(12) United States Patent
Radomski et al.

(10) Patent No.: US 9,777,599 B2
(45) Date of Patent: Oct. 3, 2017

(54) FAN CASING ARRANGEMENT FOR A GAS TURBINE ENGINE AND RELATED METHOD

(71) Applicant: ROLLS-ROYCE PLC, London (GB)

(72) Inventors: Steven Aleksy Radomski, Nottingham (GB); Simon Read, Belper (GB)

(73) Assignee: ROLLS-ROYCE plc, London (GB)

( * ) Notice: Subject to any disclaimer, the term of this patent is extended or adjusted under 35 U.S.C. 154(b) by 395 days.

(21) Appl. No.: 14/505,956

(22) Filed: Oct. 3, 2014

(65) Prior Publication Data
US 2015/0104306 A1 Apr. 16, 2015

(30) Foreign Application Priority Data

Oct. 15, 2013 (GB) .................................. 1318200.1

(51) Int. Cl.
| | |
|---|---|
| F01D 25/24 | (2006.01) |
| F01D 21/04 | (2006.01) |
| F01D 11/12 | (2006.01) |
| F02C 7/04 | (2006.01) |

(Continued)

(52) U.S. Cl.
CPC ............ F01D 25/24 (2013.01); F01D 11/122 (2013.01); F01D 21/045 (2013.01); F02C 7/04 (2013.01); *F04D 19/002* (2013.01); *F04D 29/023* (2013.01); *F05D 2220/36* (2013.01); *F05D 2250/25* (2013.01); *F05D 2300/522* (2013.01);

(Continued)

(58) Field of Classification Search
CPC ...... F01D 25/24; F01D 21/045; F01D 11/122; F05D 2220/36; F05D 2250/25; F05D 2300/522; F05D 2300/615; F02C 7/04; Y10T 29/49245

USPC .................................... 415/9, 197, 200, 220
See application file for complete search history.

(56) References Cited

U.S. PATENT DOCUMENTS

| | | | |
|---|---|---|---|
| 4,377,370 A | 3/1983 | Porcelli | |
| 7,766,603 B2 * | 8/2010 | Beckford | .............. F01D 21/045 415/119 |

FOREIGN PATENT DOCUMENTS

| | | | | |
|---|---|---|---|---|
| EP | 1 726 788 A2 | 11/2006 | | |
| GB | 839915 A | * 6/1960 | ............ | F01D 11/127 |
| GB | 840573 A | 7/1960 | | |

OTHER PUBLICATIONS

Mar. 17, 2015 European Search Report issued in European Patent Application No. EP 14 18 7610.

(Continued)

*Primary Examiner* — Ninh H Nguyen
*Assistant Examiner* — Brian P Wolcott
(74) *Attorney, Agent, or Firm* — Oliff PLC

(57) ABSTRACT

A fan casing arrangement for a gas turbine engine having a propulsive fan, the arrangement having a fan case and a fan track liner and being configured to circumscribe the fan, wherein the fan track liner is provided around the inside of fan case so as to adopt a radial position between the fan and the fan case. The fan track liner includes an elongate member which is helically-wound against the inside of the fan case in a plurality of turns. A method of installing a fan track liner in a fan casing arrangement for a gas turbine engine having a propulsive fan, the method involving: providing a fan case to circumscribe the fan, providing a flexible and elongate liner member, and helically winding the liner member against the inside of the fan case in a plurality of turns to define at least part of the fan track liner.

14 Claims, 6 Drawing Sheets

(51) Int. Cl.
*F04D 19/00* (2006.01)
*F04D 29/02* (2006.01)

(52) U.S. Cl.
CPC ... *F05D 2300/615* (2013.01); *Y10T 29/49245* (2015.01)

(56) References Cited

OTHER PUBLICATIONS

May 9, 2014 Search Report issued in British Application No. 1318200.1.

* cited by examiner

FAN CASING ARRANGEMENT FOR A GAS TURBINE ENGINE AND RELATED METHOD

The present invention relates to fan casing arrangement for a gas turbine engine, and to a method of installing a fan track liner in such an arrangement.

In the field of gas turbine engines, and in particular ducted-fan gas turbine engines, it is known to provide fan track liners inside the fan case of the engine, which surrounds the propulsive fan at the front of the engine. Fan track liners typically comprise an abradable liner which is supported by an aluminium honeycomb structure. The abradable liner consists of Nomex honeycomb which is filled with a lightweight epoxy filler. This liner forms an aerodynamic seal between the tips of the fan blades and the fan case to prevent leakage of air over the tip of the fan blades. Such leakage needs to be avoided or mitigated because it affects the performance and stability of the fan blades. Under certain operating conditions, it is acceptable for the fan blades to make contact with the abradable liner. The depth of the liner is determined by the orbiting radius of the fan blade assembly following a fan blade failure. Careful selection of the correct honeycomb density and filler hardness is essential, and indeed it is necessary to tune the characteristics of the fan track liner to the nature of the fan blades. For example, for use with a fan having generally conventional metal fan blades, the fan track liner must be strong enough to withstand ice impacts, but not too strong that the fan blade 'bounces' off the liner in the event that it becomes detached from the fan. In engines having a fan with composite blades, then the fan track liner is required to be stiffer in order to cause breakup of a detached fan blade, which is considered preferable for composite blades.

Conventional fan track liners have a complicated multi-part design which comprises a plurality of separate liner panels which are installed in side-by-side and end-to-end relation around the inner surface of the engine's fan case. This segmented arrangement results in small gaps between adjacent panels of the liner which can affect the long term integrity of the liner. This type of construction can also be complicated and expensive to install in an engine and to remove from the engine for replacement during service.

It is an object of the present invention to provide an improved fan casing arrangement for a gas turbine engine. It is another object of the present invention to provide an improved method of installing a fan track liner in a fan casing arrangement for a gas turbine engine.

According to a first aspect of the present invention, there is provided a fan casing arrangement for a gas turbine engine of a type having a propulsive fan, the fan casing arrangement having a fan case and a fan track liner, and being configured to circumscribe the fan, wherein the fan track liner is provided around the inside of fan case so as to adopt a radial position between the fan and the fan case, the arrangement being characterised in that the fan track liner includes an elongate member which is helically wound against the inside of the fan case in a plurality of turns.

The helically-wound member of the fan track liner is preferably self-supporting such that it is not radially fixed to the fan case.

Successive turns of the helically-wound member may be laterally abutting and may be laterally engaged with one another.

Conveniently, the helically-wound member has a uniform cross sectional profile along its wound length, with a projection extending outwardly from one side of the member along its length, and a recess or opening provided on the other side of the member along its length, wherein said successive turns are laterally engaged via receipt of the projection in an adjacent length of the recess or opening.

Advantageously, the elongate member has a hollow cross-sectional configuration defining an internal chamber. Said internal chamber can be filled with filler material.

In some embodiments said hollow cross-sectional configuration of the elongate member defines a plurality of discrete internal chambers. In such embodiments at least some of said internal chambers may be filled with filler material. Optionally, the filled chambers are filled with filler materials of different densities, which allows the impact properties of the liner to be tuned to particular fan blade types in order to provide optimum performance in containing detached fan blades arising from a "fan-blade-off" failure.

Conveniently, said elongate member has a plurality of integrally formed longitudinally extending spaced apart fins which project radially inwardly towards the axis about which the member is wound. The spaces between said fins may be filled with an abradable filler material.

Optionally, the elongate member is formed from aluminium or plastics material.

According to another aspect of the present invention, there is provided a method of installing a fan track liner in a fan casing arrangement for a gas turbine engine of a type having a propulsive fan, the method involving: providing a fan case to circumscribe the fan, providing a flexible and elongate liner member, and helically winding the liner member against the inside of the fan case in a plurality of turns to define at least part of the fan track liner.

Conveniently, said step of providing the flexible and elongate liner member involves extruding the liner member.

Said step of helically winding the liner member against the inside of the fan case may involve laterally abutting and/or laterally engaging successive turns of the liner member.

The elongate member may have a hollow cross-sectional configuration defining a plurality of discrete internal chambers, and the method may involve filling at least some of said chambers with respective filler materials of different densities.

The densities of said filler materials can be selected in dependence on characteristics of the fan to tune the impact characteristics of the fan track liner to the fan.

So that the invention may be more readily understood, and so that further features thereof may be appreciated, embodiments of the invention will now be described by way of example with reference to the accompanying drawings in which.

Figure 1:
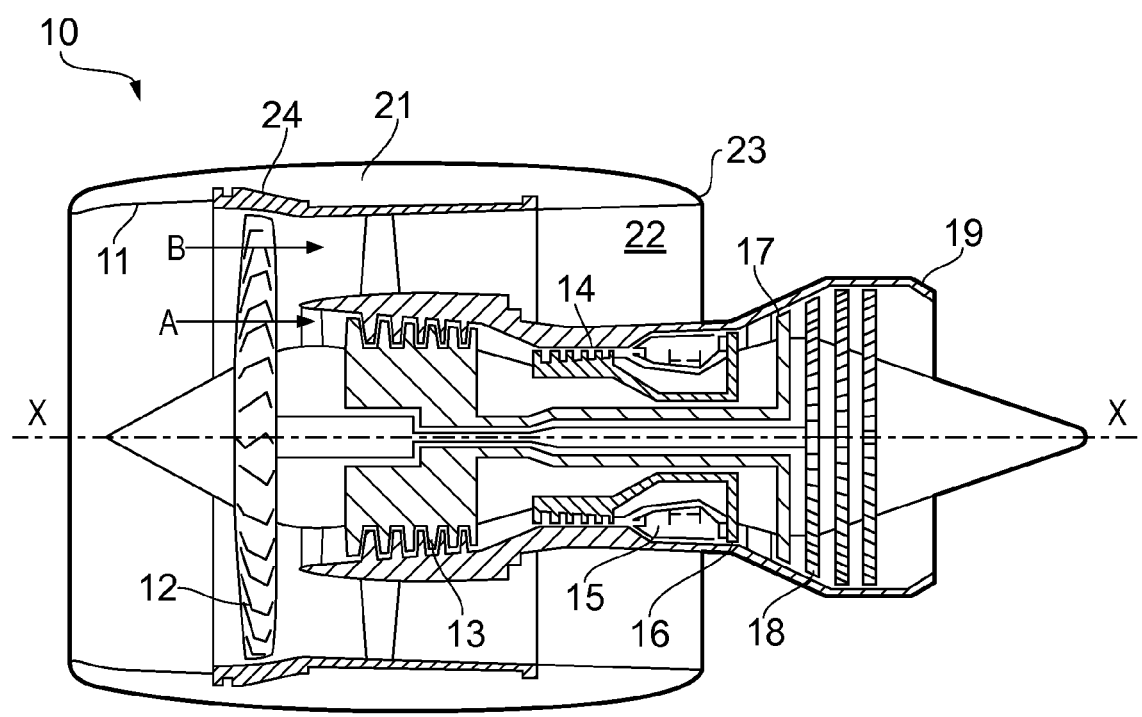
FIG. 1 is a schematic longitudinal cross-sectional view through a gas turbine engine.

Turning now to consider the drawings in more detail, FIG. 1 shows ducted fan gas turbine, generally indicated at 10, incorporating the invention and which has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Within the forward part of the nacelle 21, there is provided a fan case 24 which extends around the fan 12. As will be described in detail below, the fan case 24 is provided with a fan track liner (not shown in FIG. 1) to define a fan casing arrangement in accordance with the present invention and which circumscribes the fan 12.

Figure 2:
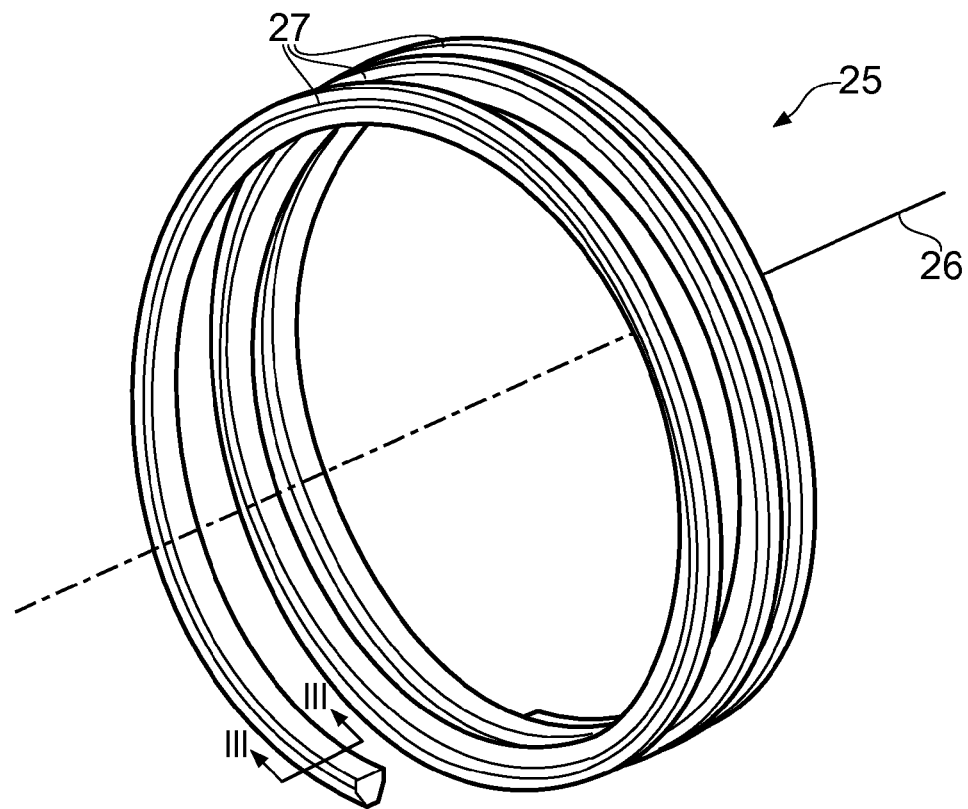
FIG. 2 is a schematic perspective view of an elongate member in accordance with the present invention.

FIG. 2 shows a principal structural member 25 of the fan track liner. The member 25 is elongate and flexible, and has a uniform transverse cross-section along its length. As illustrated in FIG. 2, the member 25 is sufficiently flexible to be helically wound around an axis 26 in a plurality of turns 27 so as to adopt a wound configuration having an outer diameter which is approximately equal to the inner diameter of the fan case 24, in a manner to be described in more detail below.

The member 25 can be conveniently formed as an extrusion from either a suitable metal such as aluminium or a plastics material such as polybutylene. The actual material selected for any given fan case arrangement will depend upon the performance characteristics required of the fan track liner in service.

Figure 3:
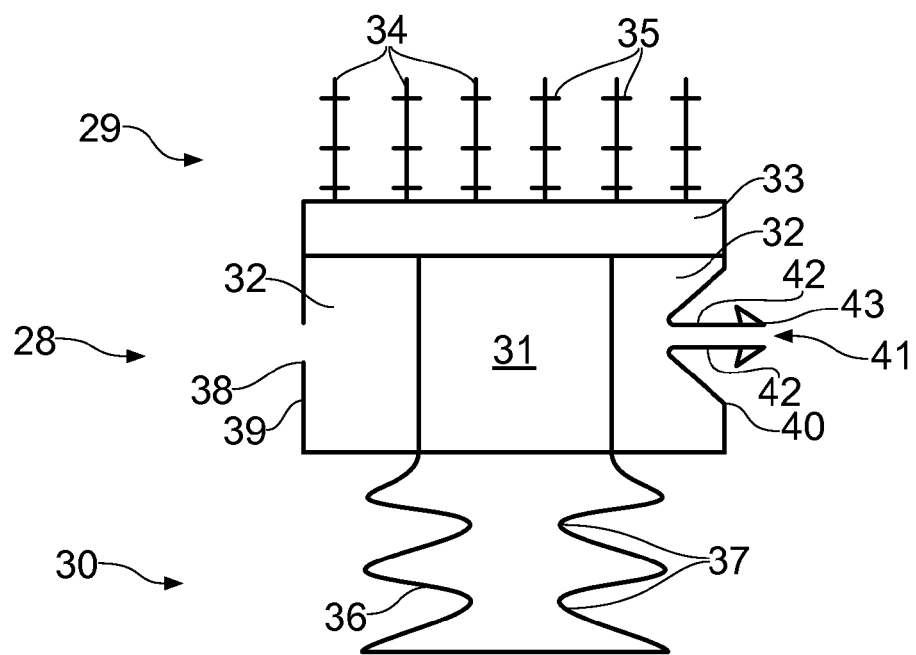
FIG. 3 is a schematic cross-sectional view through the elongate member, taken along line III-III in FIG. 2.

FIG. 3 shows the transverse cross-sectional configuration of an ideal implementation of the member 25, as viewed along line III-III in FIG. 2. The member 25 has a hollow cross-sectional configuration and comprises three regions 28, 29, 30. The radially central region 28 is generally rectangular in form and defines a plurality of discrete chambers, comprising: a central chamber 31 which is square or approximately square in transverse section; a pair of side chambers 32, each being located on a respective side of the central chamber 31; and an inner chamber 33 which extends the full width of the member 25.

The radially innermost region 29 of the member 25 is defined by a plurality of integrally formed longitudinally extending (relative to the length dimension of the member) fins 34 which are spaced apart from one another and which project radially inwardly from the central region 28 of the member 25. Each fin carries a plurality of outwardly directed projections 35 in the form of barbs.

The radially outermost region 30 of the member 25 has an integrally formed and hollow bellows-type section 36 which extends radially outwardly from the central region 28 and which is defined by a thin-wall which is folded into a plurality of loose re-entrant folds 37. The bellows section is resiliently deformable in the radial direction, with the re-entrant folds 37 serving as living hinges.

The member 25 is further provided with means to interconnect successive turns 27 when provided in its wound configuration. As shown in FIG. 3, these means comprise an opening 38 which is provided in the form of a slot which runs the length of the member 25 and which is provided in a sidewall 39 which defines one of the two side chambers 32. The other side chamber 32, on the opposite side of the member 25, has a re-entrant side wall 40, from which extends a projection 41. The projection 41 runs the length of the member 25 and is defined by a pair of flexible arms 42 which are spaced from one another. Each arm 42 carries a barb 43 at its outermost end.

Turning now to consider FIG. 4, the method by which the member 25 is installed inside the fan case 24 to create a fan track liner will now be described.

Figure 4:
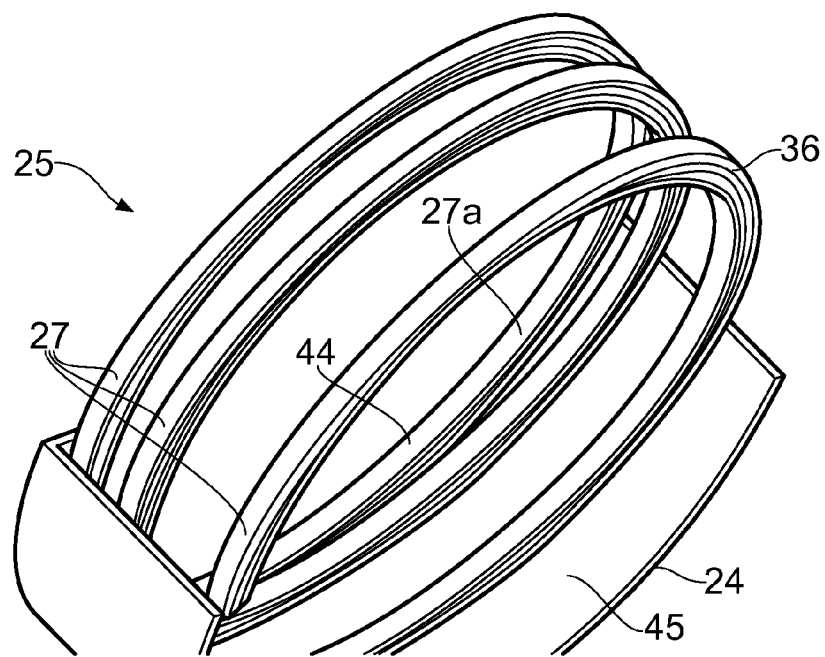
FIG. 4 is a schematic perspective view showing the elongate member of FIGS. 2 and 3 being helically wound against the inside of a section of the fan case of the engine.

FIG. 4 shows a cut-away section of the fan case 24. The fan case 24 is provided with a radially inwardly directed flange 44 which defines a stop against which the fan track liner will engage. Although not illustrated in FIG. 4, the fan case also has a second inwardly directed flange of substantially identical form, the second flange being axially spaced from the first to define therebetween a space for receipt of the member 25.

The member 25 is shown being helically-wound in an outwards manner against the inner surface 45 of the fan case 24, between the flanges, such that the bellows section 36 of the member is brought into contact with the inner surface 45. The first turn 27a is positioned in abutting engagement with the stop flange 44. The member 25 is wound about the longitudinal axis of the fan case 24, with the individual turns 27 initially being formed in a somewhat spaced apart relationship to one another, as shown in FIG. 4.

Figure 5:
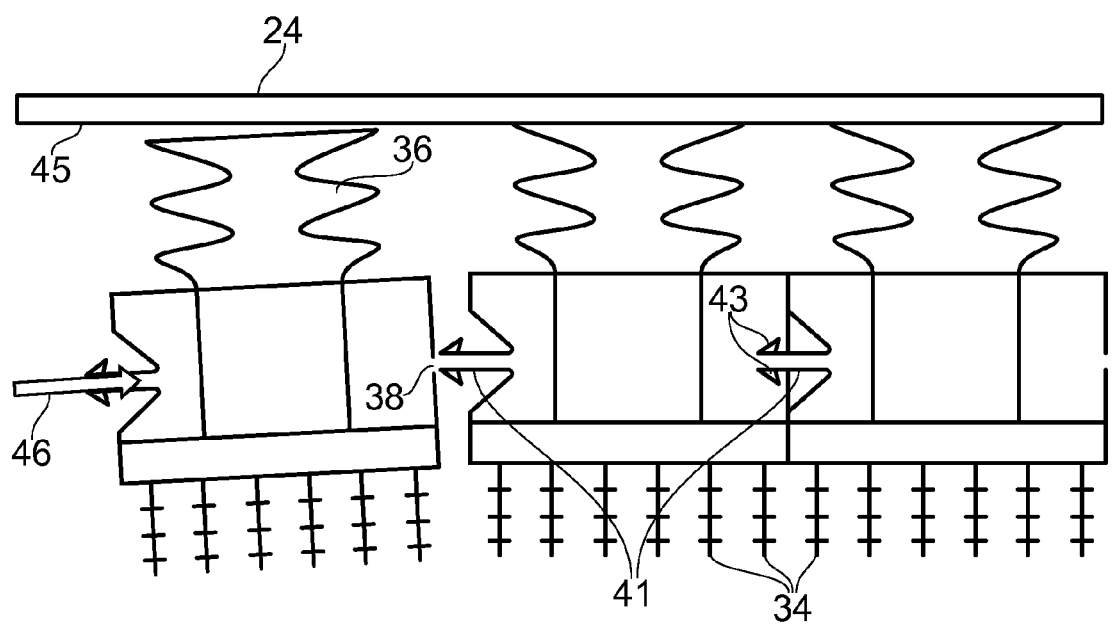
FIG. 5 is a schematic radial cross-sectional view showing successive turns of the helically wound elongate member being laterally engaged with one another.

However, as the helix into which the member 25 is wound takes shape, the successive turns 27 are brought into laterally abutting relationship with one another as indicated by arrow 46 in the radial cross-sectional view of FIG. 5. More particularly, it will be noted that the projection 41 along one side of each turn 27 is engaged within the slot 38 provided along the abutting side of the adjacent turn 27. As the projection 41 is urged into the slot 38, its flexible arms 42 are deflected towards one another, to permit insertion of the barbs 43 into the slot 38, whereupon the flexible arms 42 will then spring back to their spaced apart positions under their own resiliency, thereby retaining the barbs 43 in the slot 38 and thus laterally engaging successive turns 27.

As illustrated in FIG. 5, the fins 34 of adjacent turns 27 of the member 25 cooperate to define an array of fins across the entire axial extent of the member, the fins 34 all extending radially inwardly towards the longitudinal axis of the fan case.

Figure 6:
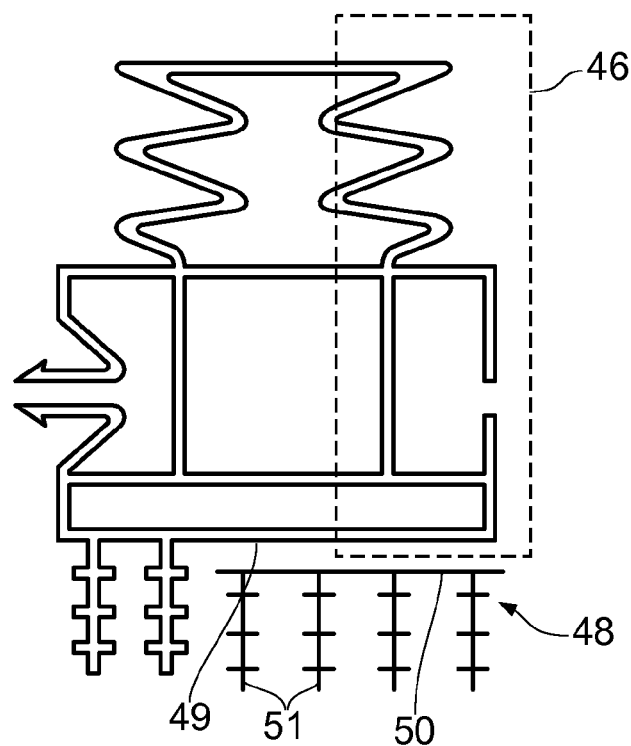
FIG. 6 is a schematic cross-sectional view through the elongate member depicted a finishing process performed on a region of the member.

The region of the member 25 which transitions from the first turn 27a against the flange 44 to the second turn is trimmed away in the region indicated generally at 47 in FIG. 6, to define a scarf joint. The creation of a scarf joint between the extreme end of the member 25 and the adjacent region of the second turn 27 in this way reduces the gap which would otherwise occur between the beginning of the second turn and the flange 44. A similar scarf joint is created at the opposite end of the member 25 where it engages against the second flange 44 (not shown). However, the creation of a scarf joint in this manner creates a discontinuity in the array of fins 34. This discontinuity can be addressed by trimming away the fins 34 from the affected region of the member 25 and then applying an annular bezel 48 to the radially inwardly directed surface 49 of the member 25 from which the fins are trimmed away. The bezel 48 comprises an annular ring 50 which supports a plurality of radially extending fins 51 of identical form to the fins 34 provided on the member 25.

When the member 25 has been fully wound against the inner surface 45 of the fan case, it is effectively self-supporting in the sense that it has sufficient inherent structural strength to support its own weight and retain its helical configuration in position against the inner surface 45 of the fan case 24, without the need to be bonded to the fan case or radially secured thereto by mechanical fixings. This strength arises in part from the cross-sectional profile of the member 25, but also from the manner in which its successive turns 27 are laterally engaged with one another via the interconnection of the projection 41 and the slot 38.

Figure 7:
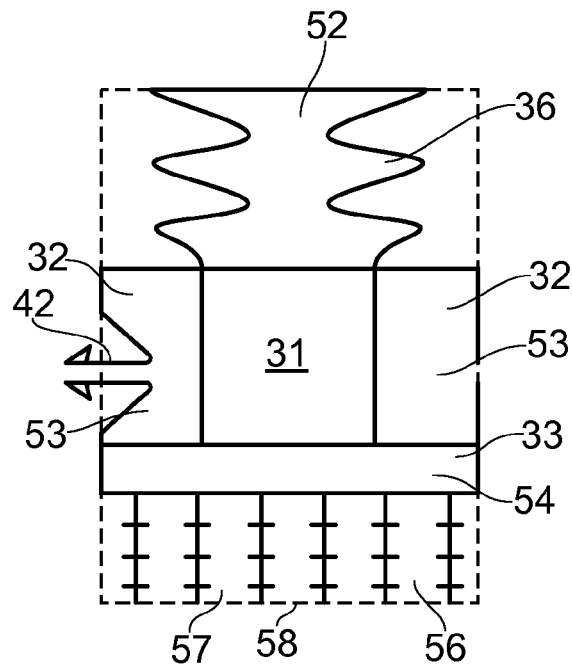
FIG. 7 is a schematic radial cross-sectional view through a single turn of the helically wound, partially filled with filler materials.

The structural integrity of the member 25 can be further enhanced by filling the helical cavity within the member 25 with suitable filler material. For example, FIG. 7 shows a radial cross-section through the member 25, and shows several of its internal chambers filled with filler material which may be, for example, injected into the member 25. In particular, the member 25 is illustrated in FIG. 7 in a configuration in which its full-width radially innermost chamber 33, its hollow bellows section 36 and its two side chambers 32 are each filled with filler material, whilst its central chamber 31 is left unfilled.

In a particular embodiment, it is proposed that the radially outwardly directed bellows section 36 will be filled with a first filler material 52 having a low density and a low level of resiliency. As the filler material 52 is injected into the helically wound bellows section 36, it will apply an outwardly directed pressure to the thin-wall defining the bellows section, which will serve to expand the bellows section slightly in a radial direction, thereby providing a positive engagement between the bellows section 36 and the inner surface 45 of the fan case 24 around the entire helical extent of the member 25.

The side chambers 32 of the member 25 may be filled with a medium density filler material 53. The provision of the filler material 53 in the side chambers 32 adds structural rigidity to the member 25, and also serves to further secure the projection 41 within the slot 38 around the member 25 by resisting relative movement of the two arms 42 of the projection 41. As will be noted from FIG. 7, filler material 53 is located between the two arms 42 of the projection 41.

The full-width chamber 33 may be filled with a high density filler material 54 as illustrated in FIG. 7. The provision of the filler material 54 in the chamber 33 adds further structural rigidity to the member 25, and in particular provides support for the adjacent array of radially inwardly directed fins 34.

The helically-extending gaps between adjacent fins 34 are also filled with a filler material 56 to define an attrition liner 57. In this case, the filler material 56 is an abradable material and may have a density similar to that of the filler material 54 used to fill the chamber 33. The fins 34 become embedded within the filler material 56, and provide a mechanical key for the filler material by providing a large surface area for the material to engage. The projecting barbs 35 provided on the fins 34 also serve to grip the abradable filler material 56 by becoming embedded therein. As will be noted, the attrition liner 57 created by the provision of the filler material 56 between the fins 34 is configured to define a radially inwardly directed surface 58 which is substantially flush with the radially innermost ends of the fins 34.

As will thus be appreciated, the resulting fan track liner comprises a plurality of internal chambers, some of which are filled with filler material of different densities (for example ranging from 0.2 grams/cm$^3$ to 1.8 grams/cm$^3$). By varying the relative densities of the filler materials 52, 53, 54, the impact characteristics of the liner, and thus its performance in a "fan-blade-off" failure of the propulsive fan 12, can be adjusted. It is therefore proposed that the densities of the filler materials 52, 53, 54 will be selected in dependence on the characteristics of the fan blade 12 around which the liner is to be provided, to tune the impact characteristics of the fan track liner to the fan 12.

When the member 25 is helically wound against the inner surface 45 of the fan case 24, and filled as described above, it defines a fan track liner which is configured to circumscribe the propulsive fan 12 of the gas turbine engine 10, and which presents the attrition liner 57 for close or rubbing contact with the tips of the blades of the fan 12.

The helically-wound configuration of the member 25, which forms the major structural component of the fan track liner means that the fan track liner is self-supporting as described above, and also avoids the creation of any gaps or discontinuities across which the blades of the fan 12 will pass during operation of the engine 10.

Figure 8:
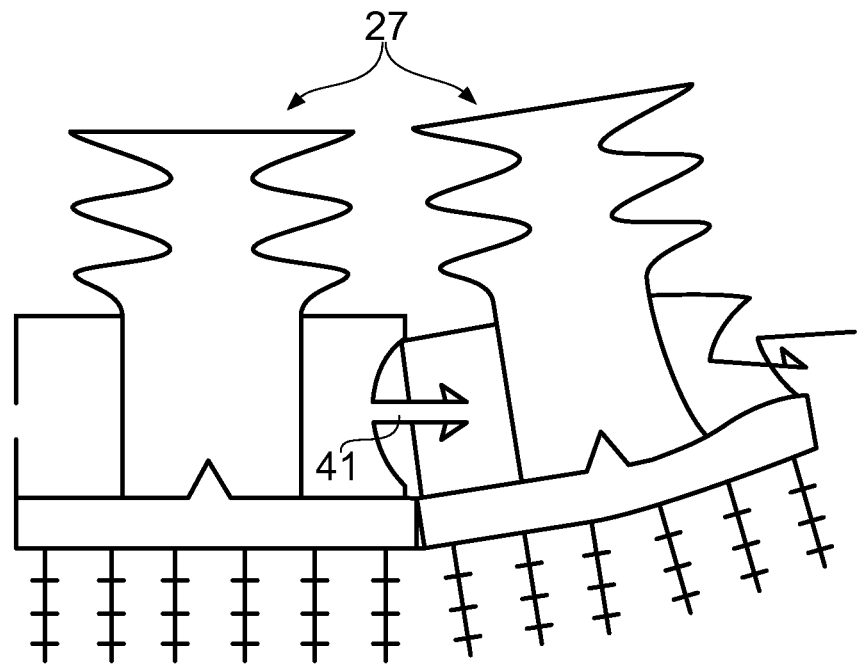
FIG. 8 is a schematic radial cross-sectional view through two adjacent turns of the helically-wound elongate member, showing the turns slightly displaced relative to one another.
Figure 9:
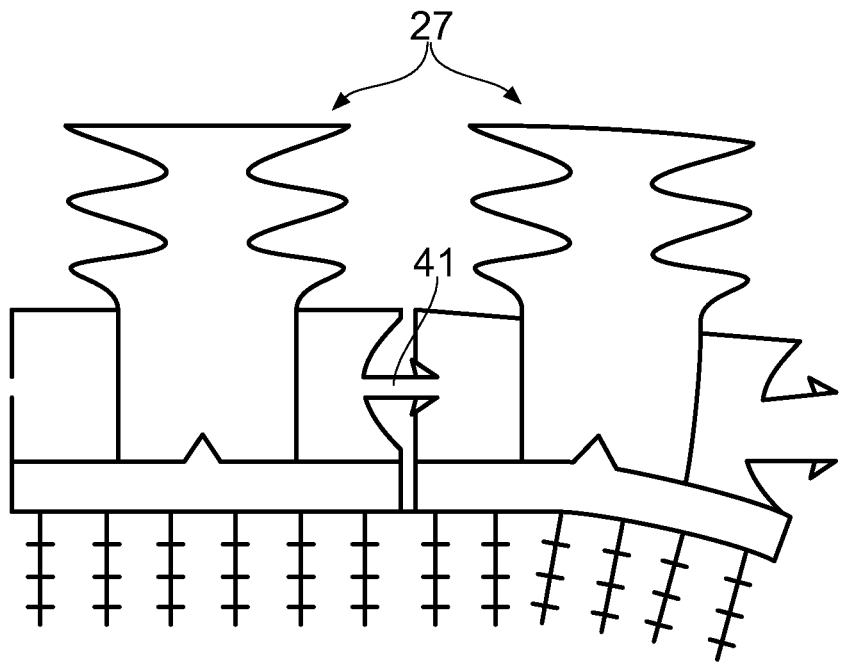
FIG. 9 is a view generally similar to that of FIG. 8, but which shows the turns of the helically-wound member displaced relative to one another in a different manner.

Turning now to consider FIGS. 8 and 9, it is to be appreciated that the helically-wound nature of the member 25 also permits the fan track liner of the present invention to be conveniently installed against a tapered fan case 24. The lateral interconnection of adjacent turns 27 of the member 25, via the projection 41 and the slot 38, can accommodate a degree of inclination between adjacent turns 27, thereby permitting the member 25 to conform to a tapered fan case profile.

Figure 10:
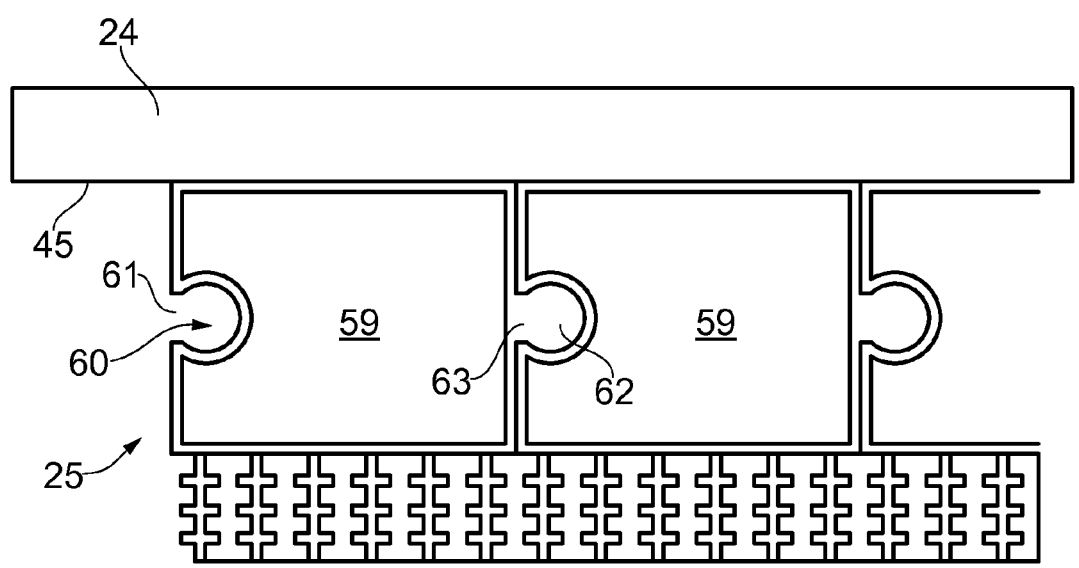
FIG. 10 is a schematic radial cross-sectional view through part of a fan case and associated helically-wound elongate member in accordance with another embodiment of the present invention.

Turning now to consider FIG. 10, there is illustrated a radial cross-sectional view through a region of a fan track liner in accordance with another embodiment of the present invention. In this arrangement it will be noted that the member 25 has a significantly simpler cross-sectional profile which comprises a single, generally square, internal chamber 59. It should of course be appreciated however, that other cross-sectional shapes for the chamber 59 are also possible. Along one side of the member 25, there is provided a recessed channel 60, which in the embodiment shown has a generally circular cross-sectional profile. The channel 60 is open to the side of the member, by way of a slot 61. The other side of the member 25 is provided with an outwardly directed projection 62 which has an enlarged head supported by a neck 63.

As will be appreciated, the recessed channel 60 and the projection 62 extend the full wound length of the member 25, and serve to interconnect adjacent turns 27 of the member in a similar manner to that proposed above in connection with the embodiment of FIGS. 2 to 9. In particular, the enlarged head of the projection 62 is received as snap-fit within the recessed channel 60 of the adjacent turn of the member 25. It is envisaged that the internal chamber 59 of the member 25 will again be filled by a suitable filler material to add structural rigidity to the member 25, and also to prevent subsequent disengagement of the projection 62 from the slot 61 by resisting deformation of the slot 61 which might otherwise permit disengagement of the projection 62.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A fan casing arrangement for a gas turbine engine of a type having a propulsive fan, the fan casing arrangement comprising a fan case and a fan track liner and being configured to circumscribe the fan, wherein the fan track liner is provided around the inside of the fan case so as to adopt a radial position between the fan and the fan case, the fan track liner including an elongate member which is helically wound against the inside of the fan case in a plurality of turns, wherein the helically-wound member of the fan track liner is self-supporting such that it is not radially fixed to the fan case.

2. The fan casing arrangement according to claim 1, wherein successive turns of the helically-wound member are laterally engaged with one another.

3. The fan casing arrangement according to claim 2, wherein said helically-wound member has a uniform cross sectional profile along its wound length, with a projection extending outwardly from one side of the member along its length, and a recess or opening provided on the other side of the member along its length, wherein said successive turns are laterally engaged via receipt of the projection in an adjacent length of the recess or opening.

4. The fan casing arrangement according to claim 1, wherein the elongate member has a hollow cross-sectional configuration defining an internal chamber.

5. The fan casing arrangement according to claim 4, wherein said internal chamber is filled with filler material.

6. The fan casing arrangement according to claim 4, wherein said hollow cross-sectional configuration of the elongate member defines a plurality of discrete internal chambers.

7. The fan casing arrangement according to claim 6, wherein at least some of said internal chambers are filled with filler material.

8. The fan casing arrangement according to claim 7, wherein the filled chambers are filled with filler materials of different densities.

9. The fan casing arrangement according to claim 1, wherein said elongate member has a plurality of integrally formed longitudinally extending spaced apart fins which project radially inwardly towards the axis around which the member is wound.

10. The fan casing arrangement according to claim 9, wherein the spaces between said fins are filled with an abradable filler material.

11. A method of installing a fan track liner in a fan casing arrangement for a gas turbine engine of a type having a propulsive fan, the method comprising: providing a fan case to circumscribe the fan, providing a flexible and elongate liner member, and helically winding the liner member against the inside of the fan case in a plurality of turns to define at least part of the fan track liner, wherein the helically-wound member of the fan track liner is self-supporting such that it is not radially fixed to the fan case.

12. The method according to claim 11, wherein said step of helically winding the liner member against the inside of the fan case comprises laterally abutting and/or laterally engaging successive turns of the liner member.

13. The method according to claim 11, wherein the elongate member has a hollow cross-sectional configuration defining a plurality of discrete internal chambers, the method further comprising filling at least some of said chambers with respective filler materials of different densities.

14. The method according to claim 13, wherein the densities of said filler materials are selected in dependence on characteristics of the fan to tune the impact characteristics of the fan track liner to the fan.

* * * * *